United States Patent
Jeong et al.

(10) Patent No.: US 10,136,352 B2
(45) Date of Patent: Nov. 20, 2018

(54) METHOD AND DEVICE FOR PREVENTING MOBILE-TERMINATED CALL DROP

(71) Applicant: Samsung Electronics Co., Ltd., Gyeonggi-do (KR)

(72) Inventors: Sang Soo Jeong, Gyeonggi-do (KR); Han Na Lim, Seoul (KR); Song Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 14/401,328

(22) PCT Filed: May 14, 2013

(86) PCT No.: PCT/KR2013/004248
§ 371 (c)(1),
(2) Date: Nov. 14, 2014

(87) PCT Pub. No.: WO2013/172623
PCT Pub. Date: Nov. 21, 2013

(65) Prior Publication Data
US 2015/0141011 A1    May 21, 2015

(30) Foreign Application Priority Data
May 14, 2012 (KR) .......... 10-2012-0051013

(51) Int. Cl.
*H04W 28/02* (2009.01)
*H04W 8/02* (2009.01)
(Continued)

(52) U.S. Cl.
CPC ......... *H04W 28/0226* (2013.01); *H04W 8/02* (2013.01); *H04W 36/14* (2013.01);
(Continued)

(58) Field of Classification Search
CPC ....... H04W 36/14; H04W 8/02; H04W 88/14; H04W 88/06; H04W 28/0226; H04W 60/04; H04W 88/08
See application file for complete search history.

(56) References Cited

U.S. PATENT DOCUMENTS

| | | | |
|---|---|---|---|
| 2006/0035662 A1* | 2/2006 | Jeong | H04W 48/06 455/525 |
| 2006/0128392 A1* | 6/2006 | Turina | H04W 48/06 455/452.1 |

(Continued)

FOREIGN PATENT DOCUMENTS

| | | |
|---|---|---|
| EP | 2369883 A1 | 9/2011 |
| EP | 2440002 A2 | 4/2012 |
| KR | 10-2012-0011012 | 2/2012 |
| WO | WO 2011/100540 A1 | 8/2011 |

OTHER PUBLICATIONS

International Search Report dated Aug. 27, 2013 in connection with International Patent Application No. PCT/KR2013/004248, 5 pages.
(Continued)

*Primary Examiner* — Dinh Nguyen

(57) ABSTRACT

Provided is a method of sending and receiving signals for a user equipment (UE) in a mobile communication system. The method may include: receiving a service reject message from a Mobility Management Entity (MME) under congestion; sending a message containing at least one piece of information determined based on the service reject message to a Mobile Switching Center (MSC); receiving a message containing camping cell information from a base station (eNB); and camping on a cell indicated by the camping cell information. In one embodiment, when an MM back-off timer is applied to the UE utilizing CSFB (or SMS over SGs) at the time of network congestion, the MSC or 2G/3G RAN node is notified that the MM back-off timer is running in the UE, so that the UE may camp not on an LTE cell but on a
(Continued)

2G/3G cell after CS service reception. Hence, it is possible to prevent call drops for MT services that may be caused by UE location registration failure due to the MM back-off timer.

16 Claims, 7 Drawing Sheets

(51) Int. Cl.
    *H04W 36/14*     (2009.01)
    *H04W 88/06*     (2009.01)
    *H04W 88/14*     (2009.01)
    *H04W 60/04*     (2009.01)
    *H04W 88/08*     (2009.01)

(52) U.S. Cl.
    CPC ........... *H04W 60/04* (2013.01); *H04W 88/06* (2013.01); *H04W 88/14* (2013.01); *H04W 88/08* (2013.01)

(56) References Cited

U.S. PATENT DOCUMENTS

| | | | |
|---|---|---|---|
| 2011/0058480 A1* | 3/2011 | Dahlen | H04W 48/06 370/237 |
| 2012/0002545 A1* | 1/2012 | Watfa | H04W 48/06 370/235 |
| 2012/0064884 A1 | 3/2012 | Ramachandran et al. | |
| 2012/0115454 A1 | 5/2012 | Liao | |
| 2012/0294144 A1* | 11/2012 | Niemi | H04W 36/0022 370/230 |
| 2014/0161004 A1* | 6/2014 | Wang | H04N 21/2365 370/281 |

OTHER PUBLICATIONS

Written Opinion of International Searching Authority dated Aug. 27, 2013 in connection with International Patent Application No. PCT/KR2013/004248, 5 pages.

* cited by examiner

METHOD AND DEVICE FOR PREVENTING MOBILE-TERMINATED CALL DROP

TECHNICAL FIELD

The present invention relates to a technique for enhancing circuit-switched (CS) service quality in the LTE system and, more particularly, to reduction of mobile-terminated call drops that may occur when circuit-switched fallback (CSFB) or Short Message Service over SGs (SMS over SGs) is utilized.

BACKGROUND ART

Currently, second and third generation systems are mainly utilized. In recent years, standardization of Long Term Evolution (LTE) regarded as a fourth generation system is in progress.

As the LTE system basically supports packet services (PS) only, the LTE standard has proposed Circuit-Switched Fallback (CSFB) to provide voice call services.

FIG. 1 illustrates a basic system architecture supporting CSFB (or SMS over SGs).

As shown in FIG. 1, CSFB refers to a service in which, when a voice call is made to a user equipment (UE) camping on the LTE system, the UE is handed over to a legacy 2G/3G system for voice call connection. To achieve this, a new interface SGs is introduced between Mobility Management Entity (MME) 120 serving as a control node on the LTE network (Evolved Packet Core, EPC) and Mobile Switching Center (MSC) 110 serving as a control node on the CS network (refer to 3GPP TS 23.272). In addition to the voice call service, as the SMS service is mainly used in the CS network, the SMS service may be realized using the SGs interface, which is referred to as SMS over SGs.

Meanwhile, to cope with significantly increased network traffic due to popularization of smartphones and introduction of new services, congestion control technology has been introduced to the mobile communication network. Specifically, in the LTE system (EPC), upon network congestion, the MME 120 may apply a back-off timer so as to prohibit the UE from performing mobility management (MM) or session management (SM) signaling for a given duration. That is, when the UE receives a back-off timer from the MME 120 (or base station or Evolved Node B (eNB)), the UE cannot send a Non Access Stratum (NAS) request (e.g. attach request, TAU request, or service request), except for special occasions, until expiration of the back-off timer (refer to 3GPP TS 23.401).

When the network operator simultaneously operates an LTE system and a 2G/3G system, a UE may selectively connect to the LTE system or the 2G/3G system according to circumstances. To control this according to network situations, a preset core network node (MME, SGSN or MSC 110) may set a Service Profile Identifier (SPID) for Radio Access Technology/Frequency Selection Priority (RFSP) and send the SPID to a preset RAN node (eNB, RNC or BSC), and the RAN node may determine priorities for Radio Access Technologies (RAT) to be selected in idle mode on the basis of the RFSP index and notify the UE of the determined priorities.

DISCLOSURE OF INVENTION

Technical Problem

Accordingly, an aspect of the present invention is to provide a scheme that can reduce reception failure of CS services such as a voice call and SMS when CSFB (or SMS over SGs) is utilized to provide a UE with a voice call service in a 3GPP mobile communication system.

Solution to Problem

In accordance with an aspect of the present invention, a method of sending and receiving signals for a user equipment (UE) in a mobile communication system is provided. The method may include: receiving a service reject message from a Mobility Management Entity (MME) under congestion; sending a message containing at least one piece of information determined based on the service reject message to a Mobile Switching Center (MSC); receiving a message containing camping cell information from a base station (eNB); and camping on a cell indicated by the camping cell information.

In accordance with another aspect of the present invention, a method of sending and receiving signals for a base station (eNB) in a mobile communication system is provided. The method may include: receiving a message, which is created by a user equipment (UE) having received information from a Mobility Management Entity (MME), from the UE; sending information contained in the received message to a Mobile Switching Center (MSC); receiving a message containing information, which is determined by the MSC having received a message from the eNB, from the MSC; and sending a message containing camping cell information, which is determined on the basis of the message received from the MSC, to the UE.

In accordance with another aspect of the present invention, a user equipment (UE) in a mobile communication system is provided. The user equipment may include: a transceiver unit to send and receive signals to and from another communication entity; and a control unit to perform a process of controlling the transceiver unit, receiving a service reject message from a Mobility Management Entity (MME) under congestion, sending a message containing at least one piece of information determined based on the service reject message to a Mobile Switching Center (MSC), receiving a message containing camping cell information from a base station (eNB), and camping on a cell indicated by the camping cell information.

In accordance with another aspect of the present invention, a base station (eNB) in a mobile communication system is provided. The base station may include: a transceiver unit to send and receive signals to and from another communication entity; and a control unit to perform a process of controlling the transceiver unit, receiving a message, which is created by a user equipment (UE) having received information from a Mobility Management Entity (MME), from the UE, sending information contained in the received message to a Mobile Switching Center (MSC), receiving a message containing information, which is determined by the MSC having received a message from the eNB, from the MSC, and sending a message containing camping cell information, which is determined on the basis of the message received from the MSC, to the UE.

Advantageous Effects of Invention

In a feature of the present invention, when an MM back-off timer is applied to a UE utilizing CSFB (or SMS over SGs) at the time of network congestion, the MSC or 2G/3G RAN node is notified that the MM back-off timer of the UE is running, so that the UE may camp not on an LTE cell but on a 2G/3G cell after CS service reception. Hence, it is possible to prevent call drops for MT services that may be caused by UE location registration failure due to the MM back-off timer.

MODE FOR THE INVENTION

Hereinafter, embodiments of the present invention are described in detail with reference to the accompanying drawings.

Descriptions of well-known functions and structures not directly related to the present invention may be omitted for clarity and conciseness.

Detailed descriptions of well-known functions and structures incorporated herein may also be omitted to avoid obscuring the subject matter of the present invention.

The following description of embodiments of the present invention is focused on the Third Generation Partnership Project (3GPP) system. However, it should be apparent to those skilled in the art that the subject matter of the present invention is also applicable to other communication/computer systems having similar technical background and configurations without significant modification.

Figure 1:
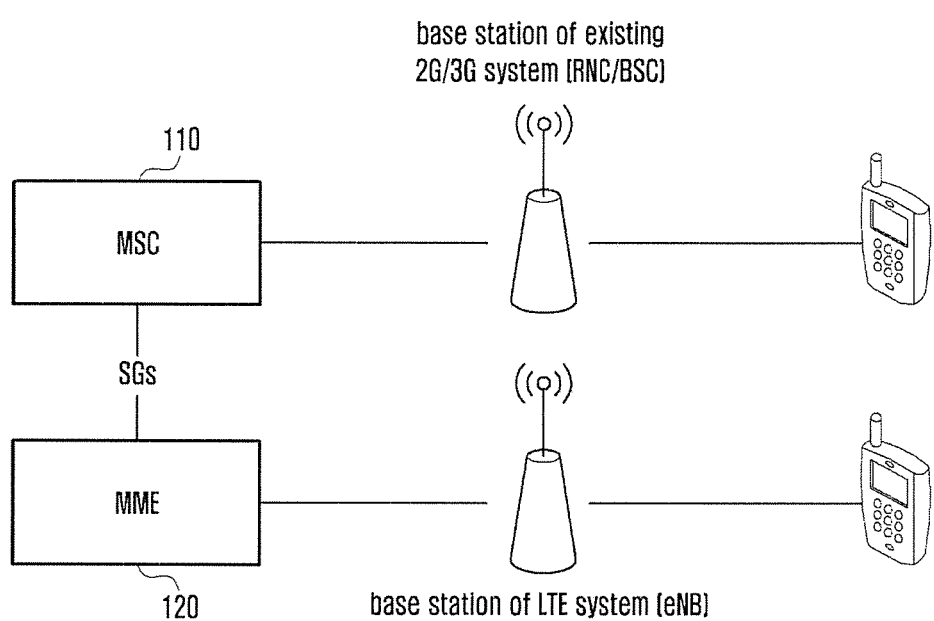
FIG. 1 illustrates a basic system architecture supporting CSFB (or SMS over SGs).
Figure 2:
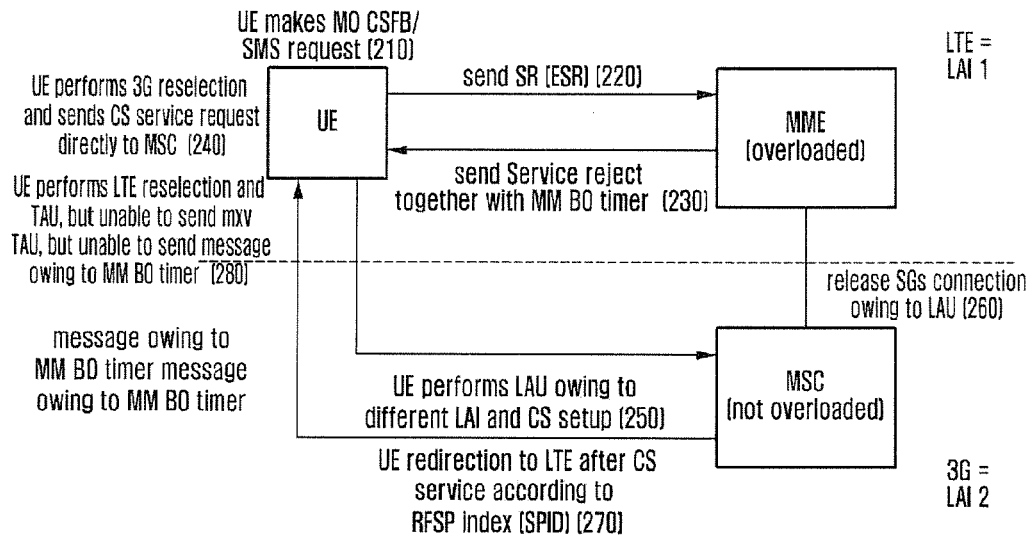
FIG. 2 depicts a problematic situation that may arise when an MM back-off timer is applied to a UE utilizing CSFB (or SMS over SGs).

The following description of embodiments of the present invention is based on the basic problematic situation depicted by steps 210 to 240 of FIG. 2. However, it should be apparent to those skilled in the art that the subject matter of the embodiments is also applicable to other similar problematic situations (e.g. the situation depicted by steps 310 to 340 of FIG. 3).

Next, a method and apparatus for preventing mobile-terminated call drop are described in detail as embodiments of the present invention with reference to the accompanying drawings.

At the time of network congestion, the core network may apply a congestion control mechanism (i.e. back-off timer) to a UE utilizing CSFB (or SMS over SGs). In this case, the UE may be unable to make a location registration request (e.g. Tracking Area Update (TAU)). The embodiments aim to prevent failure of receiving paging messages for mobile terminating services owing to inability of location registration.

In various embodiments, the Mobility Management Entity (MME) is in a congested situation, and the Mobile Switching Center (MSC) operates in a non-congested situation.

FIG. 2 depicts a problematic situation that may arise when an MM back-off timer is applied to a UE utilizing CSFB (or SMS over SGs).

Referring to FIG. 2, at step 210, when the UE camps on an LTE cell, the user makes a Mobile Originating (MO) voice call request or SMS service request.

At step 220, the UE sends an Extended Service Request (ESR, for voice call) or a Service Request (SR, for SMS) to the MME. When the MME is under congestion, at step 230, the MME rejects the request from the UE and replies to the UE with an MM back-off timer. Here, the received request may be rejected by sending a service reject message.

When the service request (ESR or SR) sent at step 220 is rejected, at step 240, the UE switches to a 2G/3G cell and sends a voice call request or SMS service request to the MSC.

Here, if a criterion for Location Area Update (LAU) is satisfied (e.g. Location Area Identity (LAI) of the new 2G/3G cell is different from that of the previous LTE cell), at step 250, the UE sends LAU to the MSC. LAU may be sent to the MSC before sending the service request.

Upon reception of LAU from the UE, at step 260, the MSC may release the SGs connection to the MME, which is required to support CSFB (or SMS over SGs).

Thereafter, paging messages for MT services addressed to the UE may be delivered through the 2G/3G cell without MME forwarding.

When the voice call or SMS transmission after LAU is completed, at step 270, the UE selects an RAT to camp according to stored or newly received RAT selection priority information (RFSP or SPID). If the RAT selection priority indicates LTE as having a higher priority, the UE may switch back to the LTE cell.

Here, as the SGs connection has been released owing to LAU performed at the 2G/3G cell (step 260), to re-establish the SGs connection for proper paging for CS services, the UE has to send a given message (e.g. Combined TAU request) to the MME. However, when the MM back-off timer is running as described above, at step 280, the UE is unable to send this request message to the eNB or MME.

In this case, the UE camps on the LTE cell with the SGs connection broken. When an MT service (incoming voice call or SMS) is requested in this situation, the MSC sends paging messages only through 2G/3G cells. Consequently, the UE is unable to receive paging for the MT service.

Figure 3:
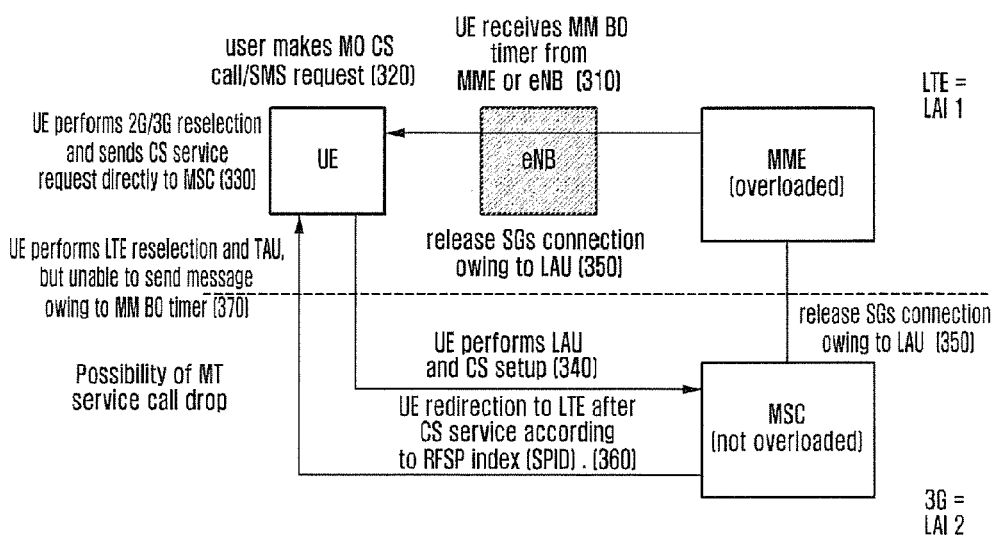
FIG. 3 depicts another problematic situation that may arise when an MM back-off timer is applied to a UE utilizing CSFB (or SMS over SGs).

FIG. 3 depicts another problematic situation that may arise when an MM back-off timer is applied to a UE utilizing CSFB (or SMS over SGs).

In FIG. 3, steps 330 to 370 may correspond respectively to steps 240 to 280 of FIG. 2. The difference from the situation of FIG. 2 is that the UE receives MM back-off timer from a core network node or RAN node first at step 310 before the user makes an MO CS or SMS service request at step 320. As described before, when the core network is under congestion, the MME or eNB may send an MM back-off timer to the UE. While the MM back-off timer is running, when an MO call or MO SMS service request is made at step 320, the UE may switch to the 2G/3G network and send a service request directly to the MSC at step 330 as in the case of FIG. 2. Subsequent steps causing a problem are the same as those of FIG. 2, and a detailed description thereof is omitted.

Figure 4:
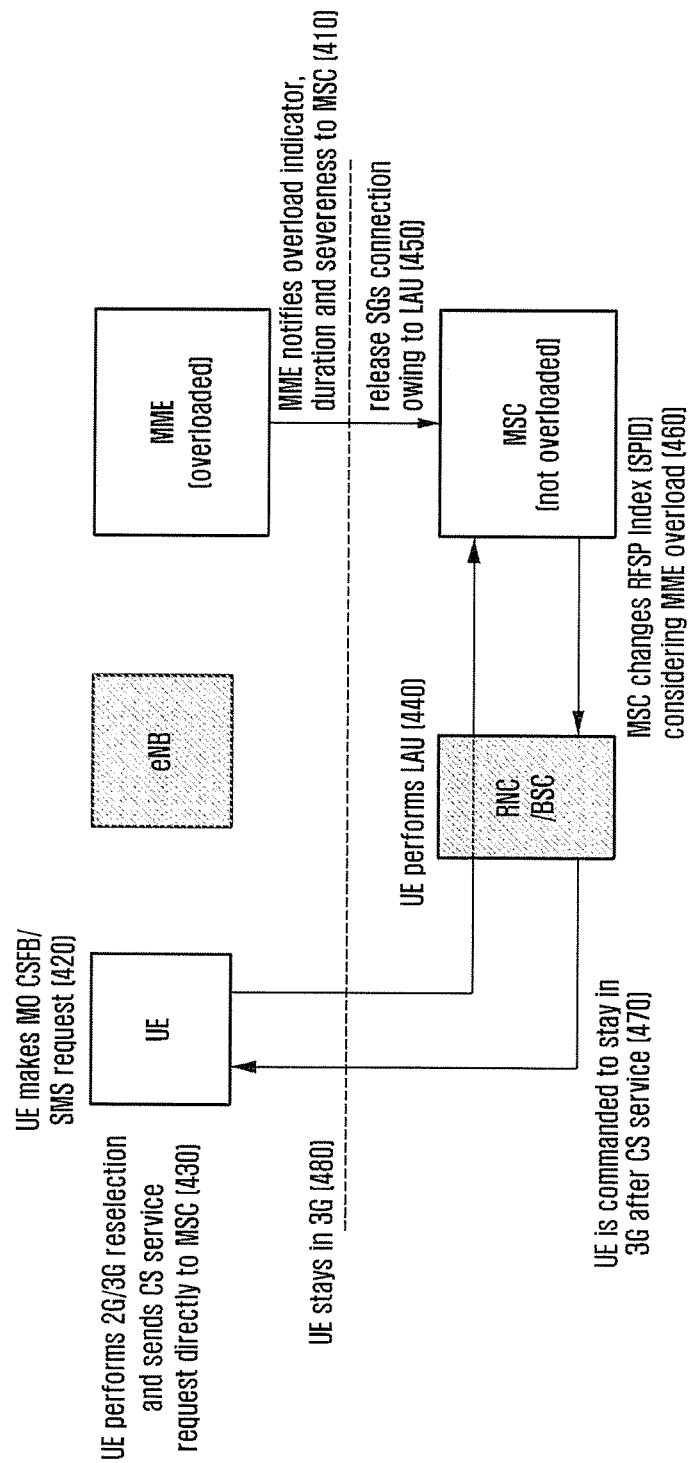
FIG. 4 depicts a problem solving method wherein the MME provides congestion information to the MSC according to an embodiment of the present invention.

FIG. 4 depicts interactions between the UE and system nodes to perform a procedure according to an embodiment of the present invention, wherein the MME provides congestion information to the MSC to address the problem.

Referring to FIG. 4, when the network becomes overloaded, at step 410, the MME sends a message indicating congestion to connected MSCs. According to embodiments, the MME may check presence of congestion on the basis of one or more factors. The congestion indication may be sent to the MSC through SGs using one of SGsAP messages (e.g. SGsAP-STATUS message and SGsAP-OVERLOAD-START message). The above message may contain at least one of MME name (address), information indicating MME congestion (e.g. overload flag), information indicating the duration under congestion (e.g. overload duration), and information indicating the degree of congestion (e.g. congestion level).

Upon reception of the above information, the MSC may be aware that the MME is overloaded. Separately from information indicating the duration under congestion, the MME may send a given message indicating resolution of congestion to the MSC. Here, the given message may be one of SGsAP messages (e.g. SGsAP-STATUS message and SGsAP-OVERLOAD-STOP message).

At step 420, the user of the UE makes an MO voice call request or MO SMS service request.

At step 430, the UE switches to the 2G/3G cell and sends a voice call request or SMS service request to the MSC.

If a criterion for Location Area Update (LAU) is satisfied (e.g. the LAI of the new 2G/3G cell is different from that of the previous LTE cell), at step 440, the UE sends LAU to the MSC. LAU may be sent to the MSC before sending the service request.

Upon reception of LAU from the UE, at step 450, the MSC releases the SGs connection to the MME, which is required to support CSFB (or SMS over SGs).

When the UE whose MM back-off timer is running connects to the MSC for a CS service (steps 420 to 450), the MSC may identify the MME at which the UE is registered on the basis of the ID and stored context of the UE. If the identified MME is overloaded (the congestion level is considered if available), at step 460, the MSC provides new SPID information (for RFSP) to the Base Station Controller (BSC) or Radio Network Controller (RNC) so that the UE may selectively camp not on the LTE cell but on the 2G/3G cell after CS service completion. The SPID information may be delivered through the Iu-CS or A interface.

Upon reception of the information, at step 470, the RNC/BSC sends a message directing 2G/3G camp-on to the UE. Here, an RRC message may be utilized to send the command.

Upon reception of the above message, at step 480, the UE camps on the 2G/3G cell in idle mode.

Later, when the MSC becomes aware of congestion resolution of the MME (e.g. reception of overload duration or separate SGsAP message), the MSC may update the RSFP index of the UE at the time of interaction with the UE.

Figure 5:
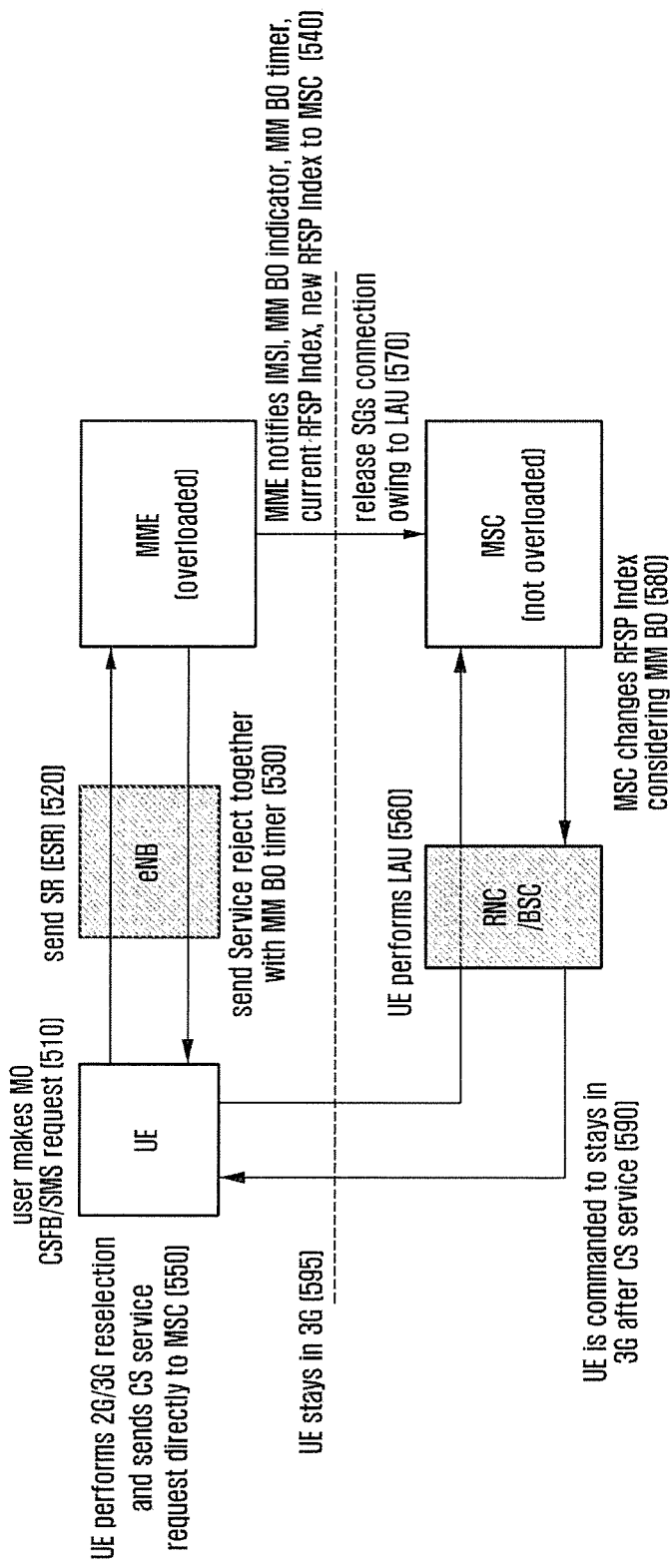
FIG. 5 depicts a problem solving method wherein the MME provides information on the UE MM back-off timer to the MSC according to another embodiment of the present invention.

FIG. 5 depicts interactions between the UE and system nodes to perform a procedure according to another embodiment of the present invention, wherein the MME provides information on the UE MM back-off timer to the MSC to address the problem.

Referring to FIG. 5, steps 510 to 530 (under congestion, the MM back-off timer is applied by the MME to the UE) correspond respectively to steps 210 to 230 of FIG. 2.

Under congestion, at step 540, the MME sends a message containing information on the UE MM back-off timer to the MSC at which the UE having sent SR or ESR is registered (i.e. MSC having SGs connection with the MME for the UE). Here, the above information may be sent to the MSC using one of SGsAP messages transmitted via the SGs interface (e.g. SGsAP-STATUS message and SGsAP-UE-ACTIVITY-INDICATION message). The above message may contain one or more of the name or address of the MME, UE information including IMSI, indication to MM back-off timer application (e.g. MM back-off indication), MM back-off timer value, current RFSP index or SPID, and new RFSP index or SPID.

Upon reception of the above message, the MSC becomes aware that the UE is congestion controlled. If MM back-off timer related information is provided, the MSC may regard that the MM back-off timer is running in the UE for a duration indicated by the timer value. Otherwise, the MSC may regard that the MM back-off timer is running in the UE until a separate message indicating congestion resolution (e.g. SGs-AP-STATUS message or SGsAP-UE-ACTIVITY-INDICATION message) is received.

The message indicating congestion resolution may contain a new RFSP index or SPID, which is to be applied by the MME to the UE. When the UE whose MM back-off timer is running communicates with the MSC for a CS service (steps 550 to 570) as described in connection with FIG. 2 or FIG. 3, at step 580, the MSC provides new SPID information to the BSC/RNC so that the UE may selectively camp not on the LTE cell but on the 2G/3G cell after CS service completion. The SPID information may be delivered through the Iu-CS or A interface. At step 590, the RNC/BSC sends a message directing 2G/3G camp-on to the UE using the delivered information. Upon reception of the above message, at step 595, the UE camps on the 2G/3G cell.

As described above, when the MME under congestion receives an SR or ESR from a UE, the MME sends congestion information for the UE to the MSC connectable with the UE. Hence, it is possible to apply differentiated congestion control measures to individual UEs.

Figure 6:
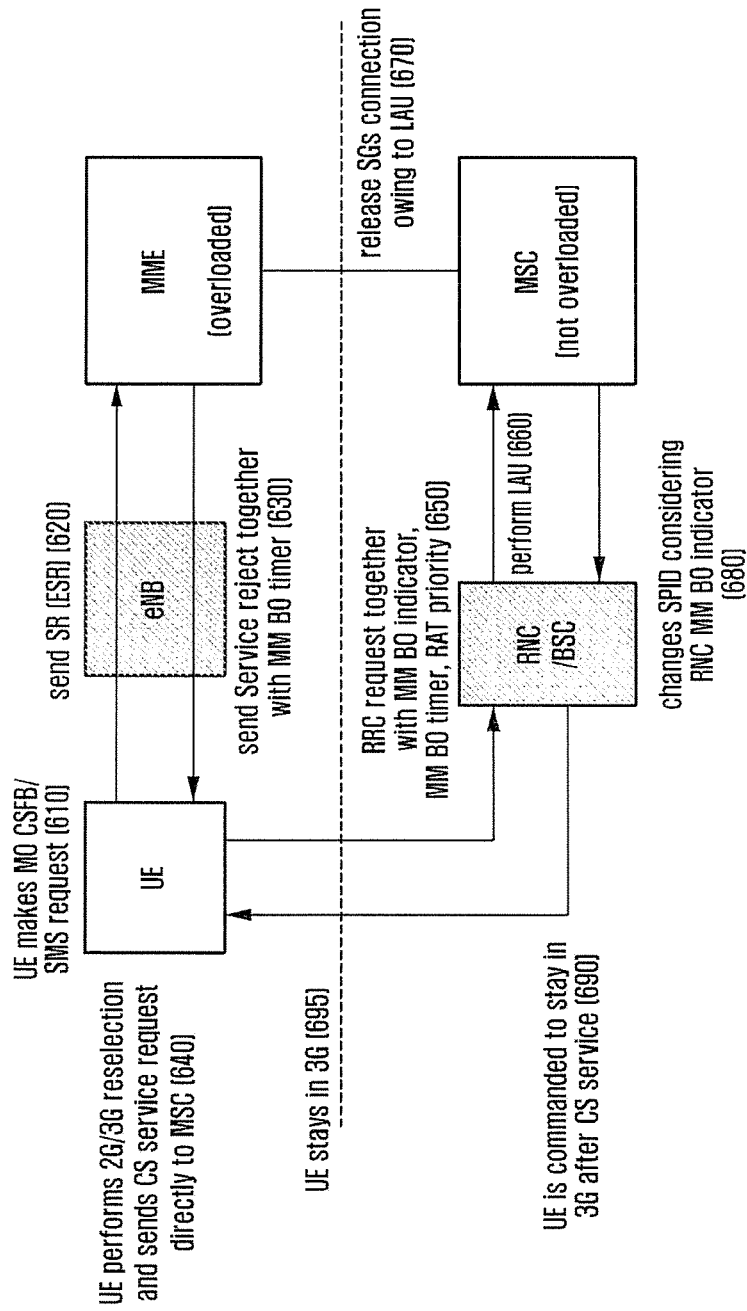
FIG. 6 depicts a problem solving method wherein the UE provides information on the MM back-off timer through Access Stratum (AS) signaling according to another embodiment of the present invention.

FIG. 6 depicts interactions between the UE and system nodes to perform a procedure according to another embodiment of the present invention, wherein the UE provides information on the MM back-off timer through Access Stratum (AS) signaling to address the problem.

Steps 610 to 640 correspond respectively to steps 210 to 240 of FIG. 2 or are similar to the communication steps described in FIG. 3.

Referring to FIG. 6, the UE whose MM back-off timer is running may send a CS service request (step 650).

Here, before sending the above message to the MSC, the UE may send a message for RRC connection setup (e.g. RRC Connection Request or RRC Connection Setup Complete) containing MM back-off timer information to the RNC/BSC.

Here, the MM back-off timer information may include one or more of indication to MM back-off timer application (e.g. MM back-off indication), MM back-off timer value, and current RAT selection priority for UE idle mode (e.g. redirectCarrierInfo).

Upon reception of the above information, the RNC/BSC becomes aware that the UE is congestion controlled. If an MM back-off timer value is provided, the RNC/BSC may regard that the MM back-off timer is running in the UE for a duration indicated by the timer value.

When the UE whose MM back-off timer is running connects to the RNC/BSC for a CS service, the RNC/BSC may send the UE a message directing 2G/3G camp-on (not LTE camp-on) after CS service completion (step 690).

As a variant embodiment, when the RNC/BSC receives MM back-off timer information from the UE, the RNC/BSC may forward the MM back-off timer information to the MSC via the Iu-CS or A interface (step 660) and may operate in accordance with the RFSP index (SPID) determined by the MSC (step 680).

Figure 7:
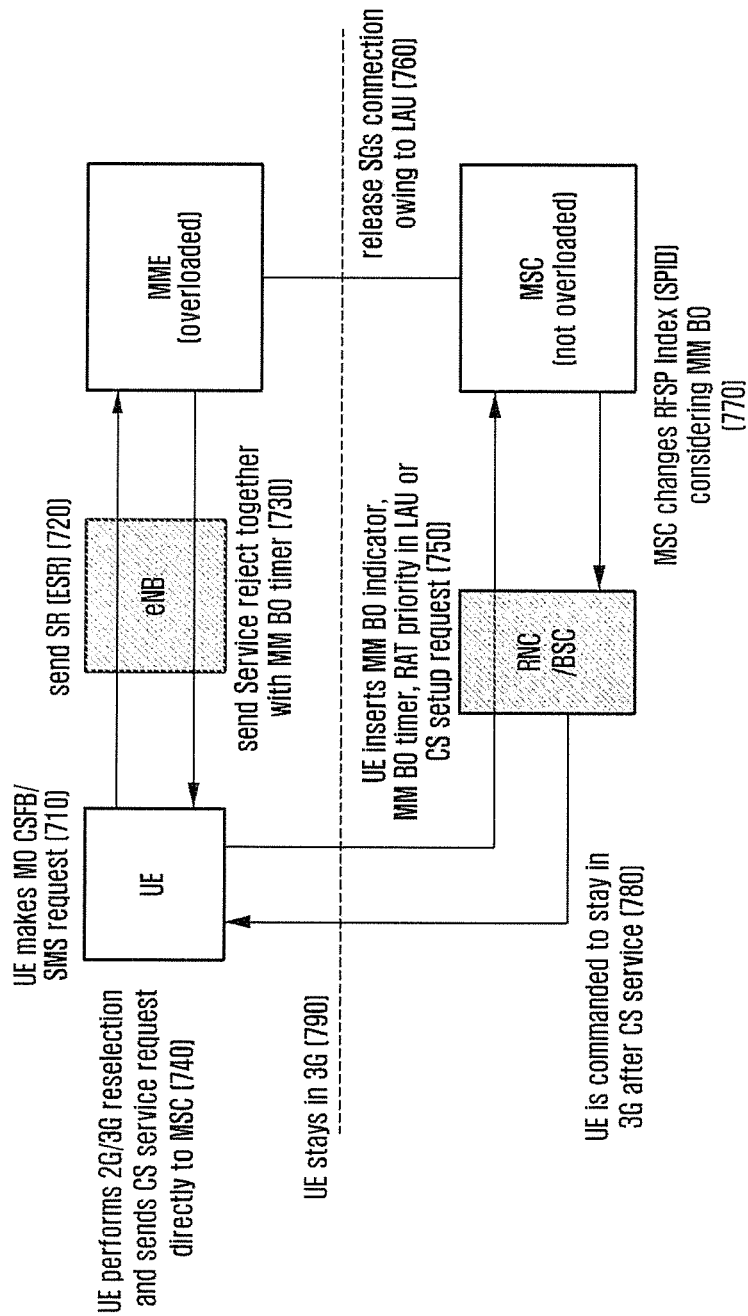
FIG. 7 depicts a problem solving method wherein the UE provides information on the MM back-off timer through Non Access Stratum (NAS) signaling according to another embodiment of the present invention.

FIG. 7 depicts interactions between the UE and system nodes to perform a procedure according to another embodiment of the present invention, wherein the UE provides information on the MM back-off timer through Non Access Stratum (NAS) signaling to address the problem.

Referring to FIG. 7, steps 710 to 740 may correspond respectively to steps 210 to 240 of FIG. 2, or are similar to the communication steps described in FIG. 3.

At step 750, to make a CS request while the MM back-off timer is running, the UE sends a message containing MM back-off timer information (e.g. LAU request or CS Setup message) to the MSC.

Here, the MM back-off timer information may include one or more of indication to MM back-off timer application (e.g. MM back-off indication), MM back-off timer value, and current RAT selection priority for UE idle mode (e.g. redirectCarrierInfo). The MSC may obtain this information via the RNC or BSC as in the case of the previous embodiment.

Upon reception of the above information, the MSC becomes aware that the UE is congestion controlled. If an MM back-off timer value is provided, the MSC may regard that the MM back-off timer is running in the UE for a duration indicated by the timer value.

When the UE whose MM back-off timer is running connects to the MSC for a CS service in a situation as described in FIG. 2 or FIG. 3, at step 770, the MSC provides information to the BSC/RNC so that the UE may camp not on the LTE cell but on the 2G/3G cell after CS service completion (SPID information for RFSP is delivered through the Iu-CS or A interface). At step 780, the RNC/BSC sends a message directing 2G/3G camp-on to the UE using the delivered information. Upon reception of the above message, at step 790, the UE camps on the 2G/3G cell.

Each of the UE, eNB, MME, RNC, BSC and MSC shown in the drawings may include a transceiver unit to exchange information with another entity and a control unit to control internal components and interpret data.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims.

The invention claimed is:

1. A method by a terminal in a mobile communication system, the method comprising:
   receiving, from a mobile management entity (MME), a service reject message comprising information on congestion of the MME and timer information related to the congestion;
   transmitting, to a mobile switching center (MSC), a first message comprising the timer information related to the congestion and the information on the congestion based on the service reject message;
   receiving, from a base station associated with the MSC, a second message comprising information indicating a cell to be camped for the terminal, the cell to be camped for the terminal being determined based on the information on the congestion; and
   camping on the cell indicated based on the information in the second message,
   wherein a message for a circuit switched service is transmitted from the MME to the MSC in response to the service reject message, the message for the circuit switched service including identification information of the terminal and information on radio access technology (RAT) selection priority associated with the MME and backoff timer information associated with the service reject message, and
   wherein the information indicating the cell to be camped for the terminal is identified based on the message for the circuit switched service.

2. The method of claim 1,
   wherein transmitting the first message comprises transmitting, to the MSC, at least one of an indication related to the congestion and the information on RAT selection priority related to the terminal.

3. The method of claim 1, wherein the information indicating the cell to be camped comprises information on a camping priority, and
   wherein if the congestion is resolved, the camping priority is updated based on a third message transmitted by the MME.

4. The method of claim 1, wherein information on a camping priority is transmitted from the MSC to the base station based on the first message, and
   wherein the information indicating the cell to be camped is identified based on the information on the camping priority.

5. A method by a base station in a mobile communication system, the method comprising:
   transmitting, to a mobility management entity (MME), a service request message related to a terminal; and
   receiving, from the MME, a service reject message related to congestion of the MME corresponding to the service request message, the service reject message comprising timer information and information on the congestion;
   wherein a first message comprising the timer information related to the congestion and the information on the congestion is transmitted from the terminal to a mobile switching center (MSC) based on the service reject message,
   wherein a second message comprising information indicating a cell to be camped for the terminal is transmitted from another base station related to the MSC to the terminal based on the first message,
   wherein a message for a circuit switched service is transmitted from the MME to the MSC in response to the service reject message, the message for the circuit switched service including identification information of the terminal and information on radio access technology (RAT) selection priority associated with the MME and backoff timer information associated with the service reject message, and
   wherein the information indicating the cell to be camped for the terminal is identified based on the message for the circuit switched service.

6. The method of claim 5, wherein the first message comprises at least one of an indication related to the congestion and the information on RAT selection priority related to the terminal.

7. The method of claim 5, wherein the information indicating the cell to be camped comprises information on a camping priority, and wherein if the congestion is resolved the camping priority is updated based on a message transmitted by the MME.

8. The method of claim 5, wherein information on a camping priority is transmitted from the MSC to the another base station based on the first message, and
wherein the information indicating the cell to be camped is identified based on the information on the camping priority.

9. A terminal in a mobile communication system, comprising:
a transceiver unit configured for transmitting and receiving at least one signal; and
a control unit configured to:
control the transceiver to receive, from a mobility management entity (MME), a service reject message related to congestion of the MME, the service reject message comprising information on the congestion and timer information related to the congestion,
control the transceiver to transmit, to a mobile switching center (MSC), a first message comprising the timer information related to the congestion and the information on the congestion based on the service reject message,
control the transceiver to receive, from a base station associated with the MSC, a second message comprising information indicating a cell to be camped from the terminal, the cell to be camped for the terminal being determined based on the information on the congestion, and
camp on the cell indicated based on the information in the second message,
wherein a message for a circuit switched service is transmitted from the MME to the MSC in response to the service reject message, the message for the circuit switched service including identification information of the terminal and information on radio access technology (RAT) selection priority associated with the MME and backoff timer information associated with the service reject message, and
wherein the information indicating the cell to be camped for the terminal is identified based on the message for the circuit switched service.

10. The terminal of claim 9, wherein the control unit is further configured to:
transmit, to the MSC, at least one of an indication related to the congestion and the information on RAT selection priority related to the terminal.

11. The terminal of claim 9, wherein the information indicating the cell to be camped comprises information on a camping priority, and
wherein if the congestion is resolved, the camping priority is updated on a third message transmitted by the MME.

12. The terminal of claim 9, wherein information on a camping priority is transmitted from the MSC to the base station based on the first message, and
wherein the information indicating the cell to be camped is identified based on the information on the camping priority.

13. A base station in a mobile communication system, comprising:
a transceiver unit configured for transmitting and receiving at least one signal; and
a control unit configured to:
transmit, to a mobility management entity (MME), a service request message related to a terminal, and
receive, from the MME, a service reject message related to congestion of the MME corresponding to the service request message, the service reject message comprising timer information and information on the congestion,
wherein a first message comprising the timer information related to the congestion and the information on the congestion is transmitted from the terminal to a mobile switching center (MSC) based on the service request message,
wherein a second message comprising information indicating a cell to be camped for the terminal is transmitted from another base station related to the MSC to the terminal based on the first message,
wherein a message for a circuit switched service is transmitted from the MME to the MSC in response to the service reject message, the message for the circuit switched service including identification information of the terminal and information on radio access technology (RAT) selection priority associated with the MME and backoff timer information associated with the service reject message, and
wherein the information indicating the cell to be camped for the terminal is identified based on the message for the circuit switched service.

14. The base station of claim 13, wherein the first message comprises at least one of an indication related to the congestion and the information on RAT selection priority related to the terminal.

15. The base station of claim 13, wherein the information indicating the cell to be camped comprises information on a camping priority, and
wherein if the congestion is resolved the camping priority is updated based on a message transmitted by the MME.

16. The base station of claim 13, wherein information on a camping priority is transmitted from the MSC to the another base station based on the first message, and
wherein the information indicating the cell to be camped is identified based on the information on the camping priority.

* * * * *